D. M. FERGUSON.
GEARING.
APPLICATION FILED OCT. 18, 1913.

1,097,217.

Patented May 19, 1914.
2 SHEETS—SHEET 1.

WITNESSES

INVENTOR
Donald M. Ferguson
BY
Ralgemond A. Parker
ATTORNEY

D. M. FERGUSON.
GEARING.
APPLICATION FILED OCT. 18, 1913.

1,097,217.

Patented May 19, 1914.
2 SHEETS—SHEET 2.

WITNESSES

INVENTOR
Donald M. Ferguson
BY
ATTORNEY

UNITED STATES PATENT OFFICE.

DONALD M. FERGUSON, OF DETROIT, MICHIGAN.

GEARING.

1,097,217. Specification of Letters Patent. Patented May 19, 1914.

Application filed October 18, 1913. Serial No. 795,850.

*To all whom it may concern:*

Be it known that I, DONALD M. FERGUSON, a citizen of the United States, residing at Detroit, county of Wayne, State of Michigan, have invented a certain new and useful Improvement in Gearing, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide an improved connection between the chain boot, or casing, and the counter shaft.

Figure 1:
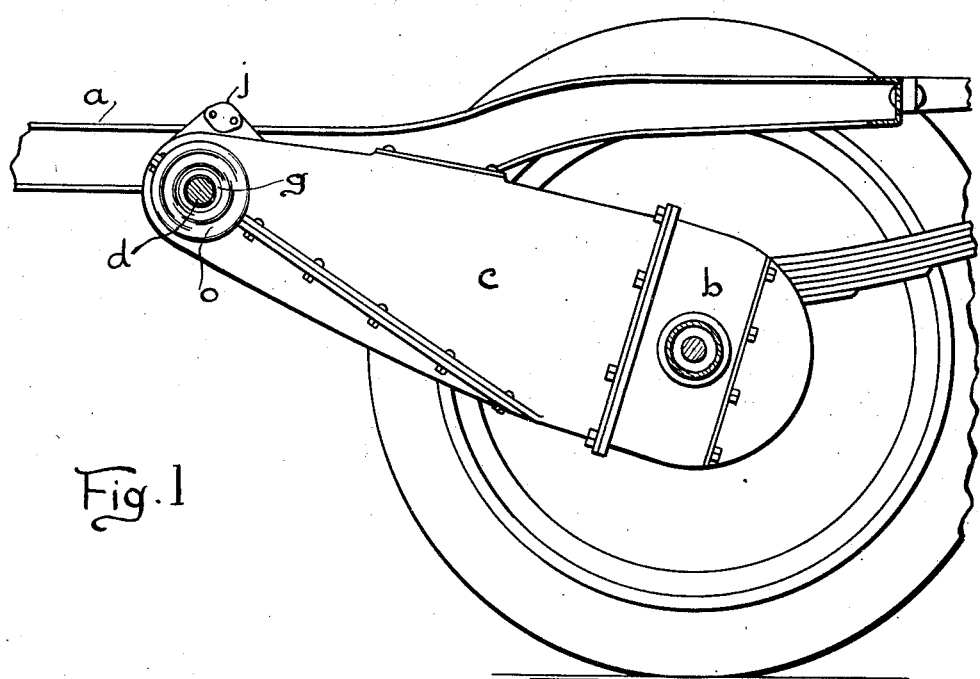
Figure 2:
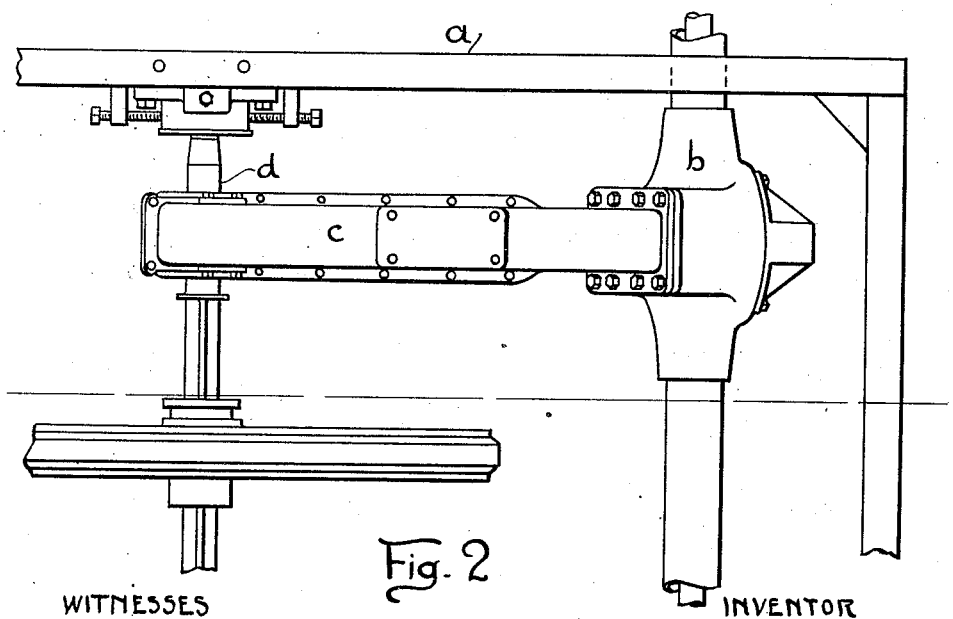
Figure 4:
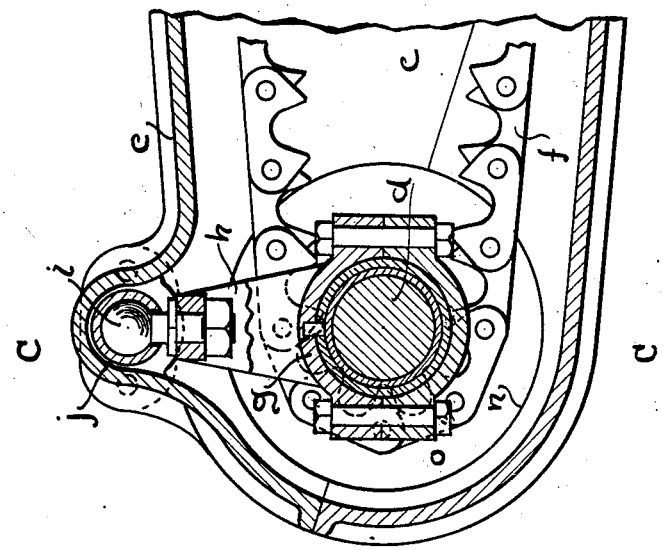
Figure 3:
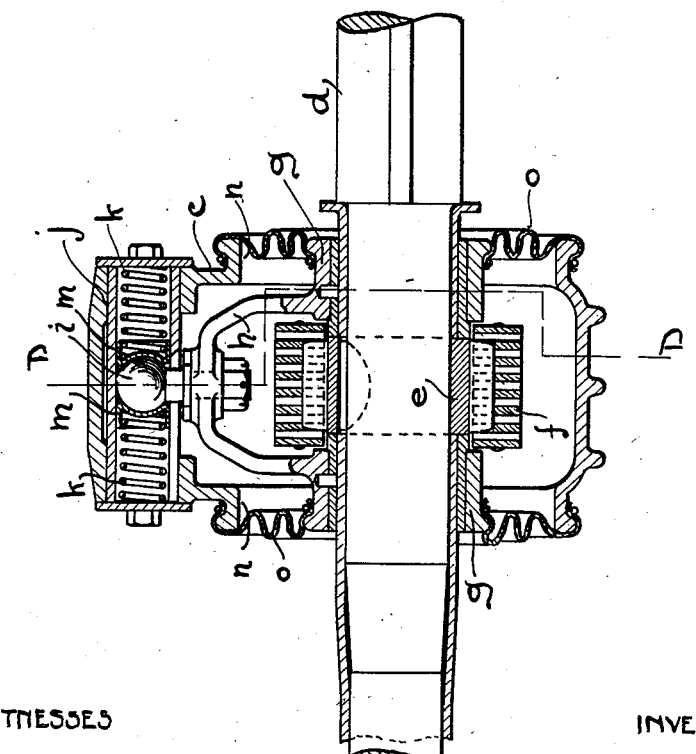

In the accompanying drawings: Figure 1, is an elevation of an apparatus embodying my invention, and so much of an automobile as is necessary to illustrate its connection therewith. Fig. 2, is a plan view of the same. Fig. 3, is a sectional view on the line C—C Fig. 4. Fig. 4, is a section on the line D—D Fig. 3.

$a$ is a part of the side bar of the chassis.

$b$ is the casing for the rear axle.

$c$ is the boot, or casing inclosing the chain, extending between the rear axle and the counter shaft $d$.

$e$ (Fig. 3) is a sprocket wheel on the counter shaft $d$. $f$ is the chain passing over said sprocket wheel and over a sprocket wheel connected with the rear axle.

$g, g$ is a sleeve surrounding the counter shaft $d$ and adapted to permit the rotation of said shaft therein.

$h$ is a standard, or riser, extending upward from the sleeve $g, g$ and bearing a ball $i$ above its upper end.

The casing $c$ at one end surrounds the counter shaft $d$ and is provided with openings $n, n$ (Fig. 3) of considerably larger diameter than the shaft through which openings said shaft extends.

$o$ is a flexible covering which may be of corrugated material, such as leather, as shown, which closes the openings $n$ $n$ but permits a relative motion of the casing and the counter shaft, or sleeve $g, g$. The coverings $o$ are secured to the sleeve $g, g$ and to the bordering edge of the openings $n$ $n$ in the casing $c$.

The casing $c$ is provided at a point above the counter shaft $d$ with a cylindrical chamber $j$ extending therethrough with its axis approximately parallel to that of the counter shaft $d$. The lower wall of the chamber $j$ is slotted and a shank extends from the riser $h$ through said slot and supports the ball $i$ in the chamber $j$ approximately concentric therewith.

$m$ $m$ are sheet-metal stampings adapted to fit and reciprocate in the chamber $j$ and having their faces, which are toward each other, shaped to, and fitting against, opposite surfaces of the ball $i$.

$k, k$ are springs pressing the sheet metal parts $m$ against the ball $i$ and forming a ball and socket joint therewith. The end of the casing adjacent to the counter shaft $d$ is supported by said ball and socket joint upon the riser $h$ and sleeve $g, g$.

By this construction a connection is secured which permits of the relative angular movement of the rear axle with its casing $b$, and the counter shaft $d$. The rear wheels pass over uneven surfaces and are continually changing their relative vertical positions and causing the main shaft and the casing $b$ to oscillate, relative to the frame and counter shaft $d$. The casing $b$ carries with it the boot $c$ and this boot may turn freely about the universal joint $i$, the coverings $o$ $o$ yielding to permit relative motion of the edges of the sleeve $g$ and the edges of the boot $c$ surrounding the opening around the counter shaft.

What I claim is:

1. In an automobile, the combination of a counter shaft, a chain boot surrounding said counter shaft and formed to leave a space between said counter shaft and the adjacent portion of said boot, a flexible connection between said boot and counter shaft, and a flexible covering closing the space between said counter shaft and the adjacent portion of said boot.

2. In an automobile, a counter shaft, a sleeve upon said counter shaft, a projection from said sleeve carrying a portion of a hinged joint, a boot surrounding said counter shaft and provided with means for forming a complete joint with the portion of the joint connected to said sleeve.

3. In an automobile, a counter shaft, a sleeve upon said counter shaft, a projection from said sleeve carrying a portion of a hinged joint, a boot surrounding said counter shaft and provided with means for forming a complete joint with the portion of the joint connected to said sleeve, said boot being so constructed as to leave a space between said counter shaft and the adjacent portion of said boot, and a flexible means for closing said space.

4. In an automobile, a counter shaft, a sleeve upon said counter shaft, a projection from said sleeve carrying a ball, a boot surrounding said counter shaft so as to permit relative angular motion, socket members in said boot and springs pressing said socket member against said ball to form a ball and socket joint.

In testimony whereof, I sign this specification in the presence of two witnesses.

DONALD M. FERGUSON.

Witnesses:
VIRGINIA C. SPRATT,
ELLIOTT J. STODDARD.

Copies of this patent may be obtained for five cents each, by addressing the "Commissioner of Patents, Washington, D. C."